United States Patent

[11] 3,603,418

[72] Inventors Kenneth J. Schmidt;
James A. Lacock, both of Springfield, Oreg.
[21] Appl. No. 867,265
[22] Filed Oct. 17, 1969
[45] Patented Sept. 7, 1971
[73] Assignee General Trailer Co., Inc.
Springfield, Oreg.

[54] VEHICLE LOAD MEASURING APPARATUS
8 Claims, 7 Drawing Figs.
[52] U.S. Cl................................................ 177/136,
177/211, 73/141 A
[51] Int. Cl................................................. G01g 19/08
[50] Field of Search......................................... 177/136,
137, 211, 138; 73/141 A

[56] References Cited
UNITED STATES PATENTS
3,315,203   4/1967   Jacobson........................   73/141 A
3,322,220   5/1967   Bash...............................   177/137
3,443,652   5/1969   Videon............................   177/211 X
3,447,362   6/1969   Pien................................   73/141 A Primary Examiner—Richard B. Wilkinson
Assistant Examiner—George H. Miller, Jr.
Attorney—Kolisch & Hartwell ABSTRACT: Apparatus for use in a vehicle for measuring a load supported thereon including a deformable member which deforms in relation to the weight of the load, a DC voltage transmitter connected to the member for transmitting a voltage related to the deformation of the member, with a given DC voltage supplied to the transmitter, and an indicator connected to the voltage transmitter for producing an indication related to such voltage. The indicator and voltage transmitter are connected through a coupling which enables selective disconnection of the two. The indicator has a sufficiently high input impedance, whereby any resistance produced in the coupling due to the collection therein of dirt or other foreign matter has a negligible effect on the voltage indicated by the indicator.

PATENTED SEP 7 1971 3,603,418
SHEET 1 OF 2
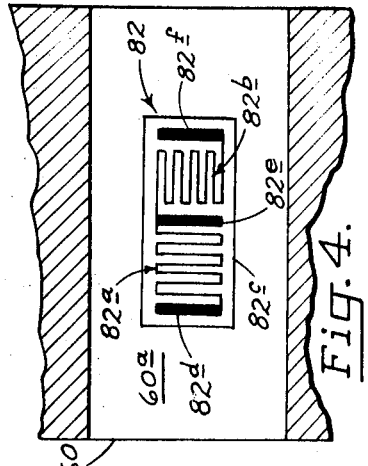
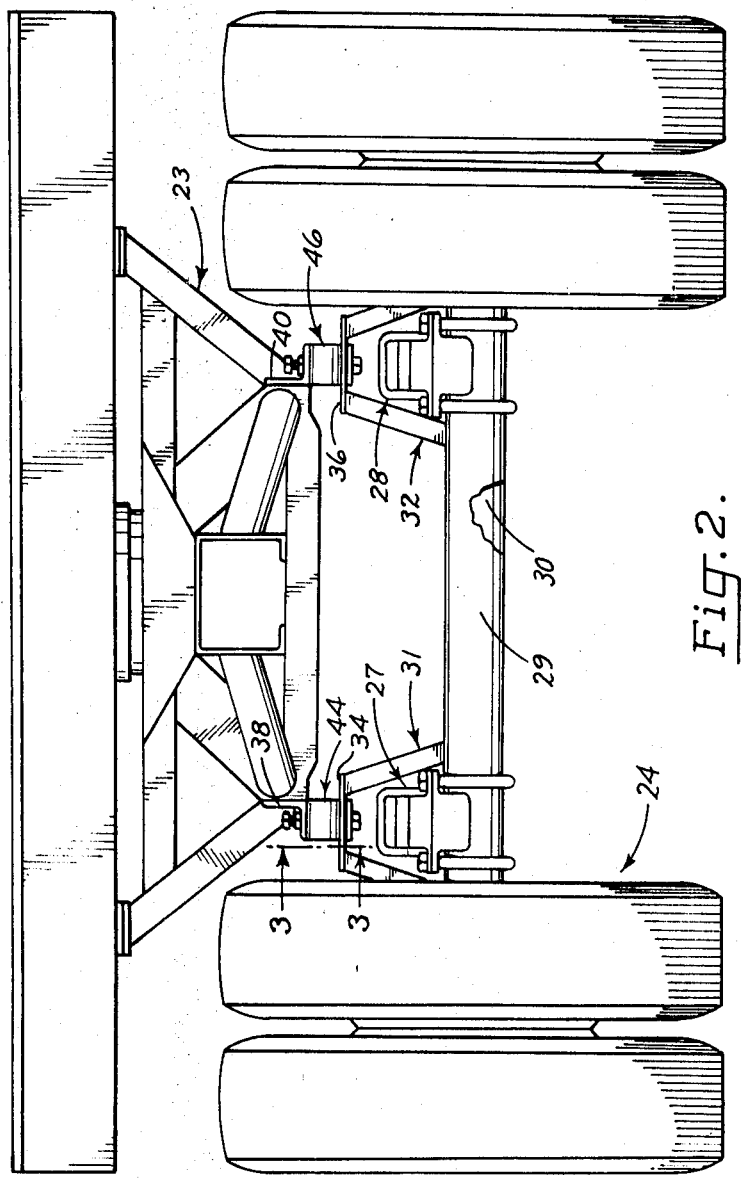
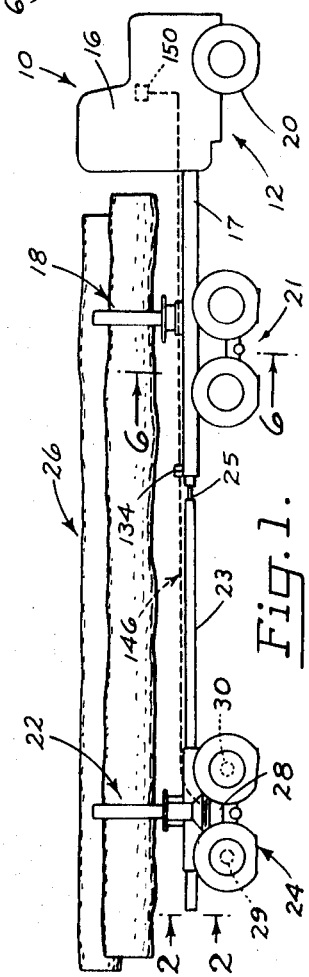
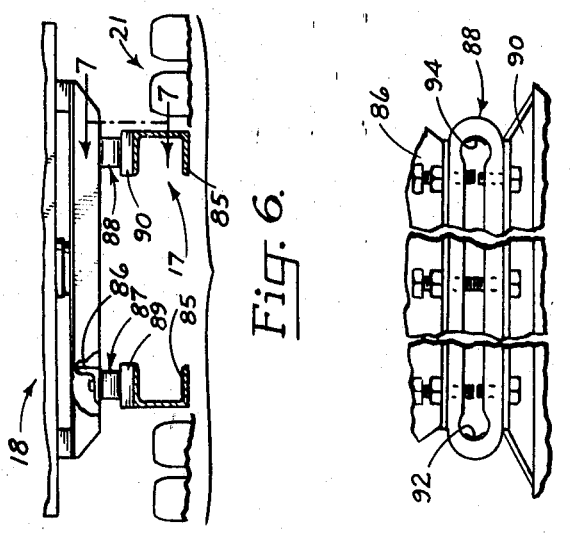
Kenneth J. Schmidt
James A. Lacock
INVENTORS
BY
Kolisch & Hartwell
Attys.

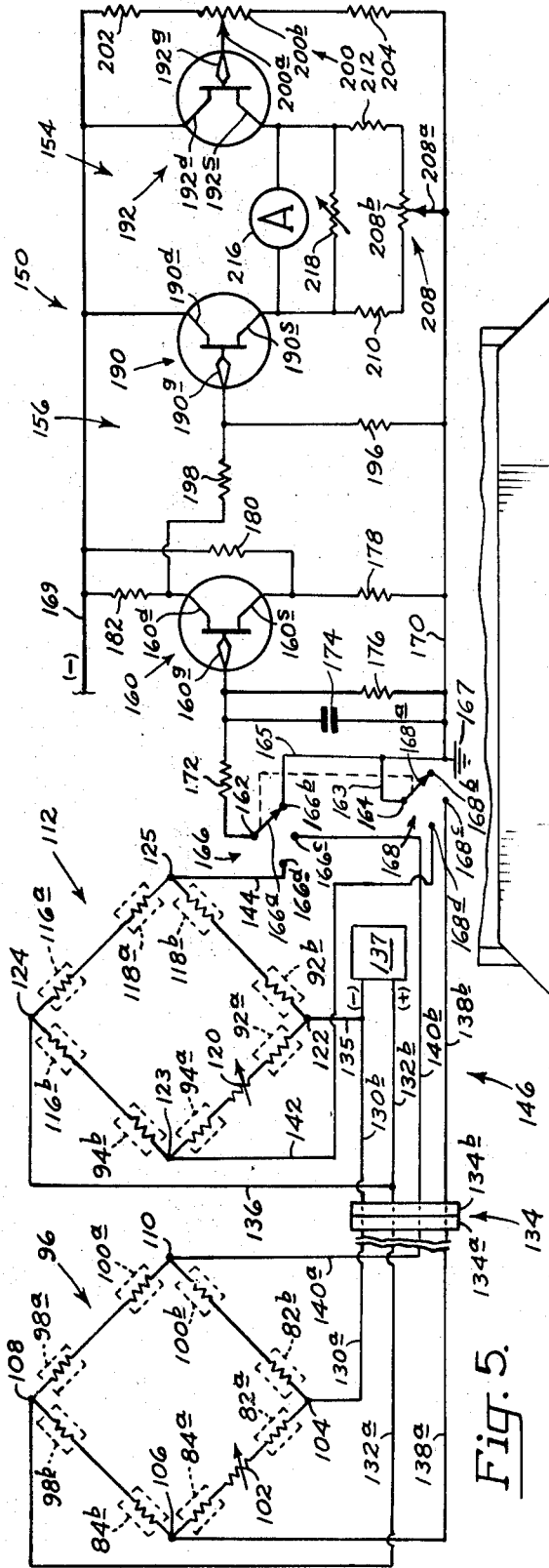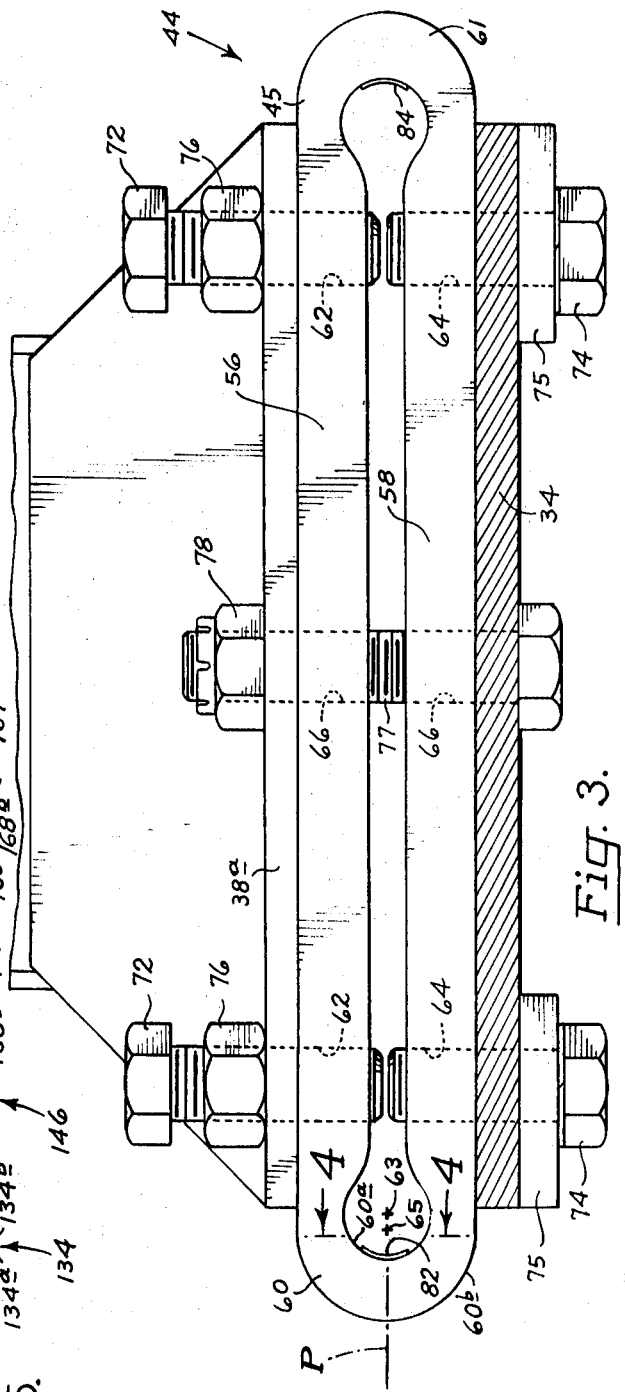
Fig. 5.
Fig. 3.
Kenneth J. Schmidt
James A. Lacock
INVENTORS
BY
Kolisch & Hartwell
Attys.

VEHICLE LOAD MEASURING APPARATUS

This invention relates to load-measuring apparatus for a vehicle. For purposes of illustration, a preferred embodiment of the invention is described herein in conjunction with a log truck having a separable tractor and trailer.

Due to weight restrictions placed on vehicle loads by state agencies, it has become necessary for many engaged in heavy hauling to equip their vehicles with apparatus for measuring the weight of loads. This has become particularly important in connection with hauling loads, such as logs, which are picked up at locations remote from a conventional weighing station. For such apparatus to perform satisfactorily, several factors should be considered.

To begin with, and for the sake of maximum convenience, whereas sensors employed in such apparatus to sense the weight of a load should be located closely adjacent the load support structure on a vehicle, the load indicator preferably should be mounted inside the driver's compartment. To achieve this practically in the case of tractor and trailer combinations, which are commonly used in heavy hauling situations, the means connecting the sensors and indicator should be readily disconnectable to accommodate separation of the sections. Further, the means employed to accommodate such disconnection should be constructed to minimize any effects which repeated connectings and disconnectings might have on the accuracy of load indications. In addition, and for the sake of simplicity and economy, apparatus of the type so far generally mentioned should utilize electrical circuitry wherever possible for transmitting information.

A general object of the present invention, therefore, is to provide for use in a load-handling vehicle novel load-measuring apparatus which takes the above-mentioned factors into account in a practical and satisfying manner.

More specifically, and to afford maximum convenience, an object of the invention is to provide such apparatus which includes a load sensor adapted to be mounted on the vehicle closely adjacent the load support structure, and an indicator adapted to be mounted on the vehicle within the driver's compartment.

Another object is to provide such apparatus wherein the indicator is electrical and electrical circuitry is used to transmit information from the sensor to the indicator.

A further object of the invention is to provide apparatus of the type so far indicated which is readily adaptable for use on a vehicle, such as a tractor and trailer combination, having separable sections.

A related object is to provide such load-measuring apparatus wherein the load sensor and indicator are readily disconnectable, and repeated connectings and disconnectings of the same above a negligible effect on the accuracy of load indications. To attain this and the preceding object, the organization of the invention contemplates conductor means interconnecting the load sensor and the indicator including a disconnectable coupling enabling selective disconnection of the two. Further, the indicator features an input circuit having a sufficiently high input impedance, whereby resistance introduced into the disconnectable coupling (through the collection of dirt and other foreign matter) with repeated use has no appreciable effect on the transmission of information from the sensor to the indicator.

Still another object of the invention is to provide load-measuring apparatus of the type indicated wherein the load sensor comprises a unitary, nonangular deformable member having elongated vertically spaced upper and lower portions connected and supported one above the other and adjacent their opposite sets of ends by arcuate portions. Employed in conjunction with the deformable member are strain gauges mounted conveniently on the arcuate portions.

These and other objects and advantages will become more fully apparent as the following description is read in conjunction with the drawings, wherein:

FIG. 1 is a simplified side elevation of a log truck on which load-measuring apparatus as contemplated by the invention is installed;

FIG. 2 is an enlarged view taken generally along the line 2—2 in FIG. 1, with portions broken away;

FIG. 3 is a view taken generally along the line 3—3 in FIG. 2, and enlarged in scale, illustrating a deformable member in the load-measuring apparatus;

FIG. 4 is a view, on a larger scale than FIG. 3, taken generally along the line 4—4 in FIG. 3;

FIG. 5 is a schematic diagram of electrical circuitry in the load-measuring apparatus;

FIG. 6 is a view taken generally along the line 6—6 in FIG. 1, and enlarged in scale; and FIG. 7 is a view taken generally along the line 7—7 in FIG. 6 on a larger scale than FIG. 6.

Referring now to the drawings, and first more specifically to FIG. 1, at 10 is indicated a vehicle, in this case a log truck, having a separable tractor 12 and trailer 14.

Tractor 12 includes an elongated frame 17. Mounted on the front end of frame 17 is the usual driver's compartment, or cab, 16. Mounted on frame 17 rearwardly of cab 16 (in a manner which will later be described more fully) is a log support bunk 18. Frame 17 is supported for movement over the ground through the usual front and rear wheel assemblies 20, 21, respectively, the wheels in assembly 21 being powered conventionally by the tractor's engine.

Trailer 14 includes an elongated frame 23, adjacent the rear of which is mounted a log support bunk 22. Mounted on frame 23 beneath bunk 22 is a wheel assembly 24 which supports the rear of the frame, in a manner which will be more fully explained shortly, for movement over the ground. The front of frame 23 is separably connected to the rear of frame 17 through a conventional connector 25.

Truck 10 is shown in FIG. 1 carrying a load of logs indicated generally at 26. The forward ends of the logs are supported on bunk 18 and the rear ends of the logs are supported on bunk 22.

Further describing the structure through which wheel assembly 24 supports the rear of frame 23, and referring to FIGS. 1 and 2, conventional leaf spring assemblies 27, 28 interconnect, in the usual fashion, the opposite sets of ends of the two axle structures 29, 30 in assembly 24. Suitably mounted on and extending upwardly from spring assemblies 27, 28, intermediate the axle structures, are brackets 31, 32, respectively. Bracket 31 includes a substantially horizontal top plate 34, and bracket 32 includes a similar top plate 36.

Opposite sides of frame 23 are anchored to plates 34, 36 through a pair of angle members 38, 40, respectively, and through a pair of load sensors 44, 46, respectively, which form part of the load-measuring apparatus as contemplated herein.

Sensors 44, 46 are substantially the same in construction, and considering sensor 44, this is illustrated more fully in FIGS. 3 and 4. Sensor 44 comprises an elongated, unitary, nonangular deformable member 45, having a configuration, when viewed from a side as in FIG. 3, somewhat resembling the continuous track of a track-laying vehicle. Member 45 includes spaced, parallel upper and lower portions 56, 58, respectively. Arcuate end portions 60, 61 join with the upper and lower portions as shown.

As viewed in FIG. 3, the curved surfaces 60a (interior) and 60b (exterior) of end portion 60 follow circular paths. The center of curvature (shown generally at 63) for the path followed by surface 60a is spaced inwardly on the member from the center of curvature (shown generally at 65) for the path followed by surface 60b. With this construction, the end portion has its greatest thickness where it intersects the plane indicated at P———the region of the portion which is subjected to the maximum bending stress with movement of portions 56,58 toward and away from each other. Substantially the same construction characterizes end portion 61.

Adjacent opposite ends of portions 56,58, tapped axially aligned bores 62, 64 are provided. A pair of axially aligned untapped bores 66 extend through portions 56, 58 substantially centrally between the other aligned bores just mentioned.

Considering now in detail how sensor 44 is anchored in place between plate 34 and angle member 38, this is illustrated in FIG. 3. Member 45 is clamped between a flange 38a of member 38 and plate 34 by a bolt 77 and nut 78. Bolt 77 extends freely through bores 66 and through suitable aligned accommodating bores in the plate and flange. Nut 78 is adjusted on the bolt to produce slight deformation in member 45, urging portions 56, 58 toward one another.

Extending downwardly through bores 62, and through suitable aligned bores in flange 38a are bolts 72. These bolts are held in place by nuts 76 which are tightened against the top side of flange 38a in FIG. 3. It will be noted that the lower ends of bolts 72 in the figure extend into the space between portions 56, 58 of member 45. The amount of such extension may be adjusted through adjustment of bolts 72 and of the positions of nuts 76 on bolts 72. Extending upwardly through bores 64, and also through aligned bores in plate 34, are bolts 74. Spacers 75 are provided between the heads of these bolts and the plate. The lengths of bolts 74, and the thickness of spacers 75 are selected whereby, with the bolts tightened in place, the upper ends of the bolts extend into the space between portions 56, 58.

It will be noted that the lower ends of bolts 72 in FIG. 3 are spaced from the upper ends of bolts 74 in the figure. The amount of space provided between such ends determines the amount of deformation which may occur in member 45 with portions 56, 58 urged toward one another. Bolts 72, 74 and nuts 76 constitute limit means herein.

Also forming part of sensor 44 are conventional electrical resistance strain gauges 82, 84 which are substantially the same in construction. Gauges 82, 84 are secured, as by cementing, to surface 60b and the corresponding surface of end portion 61, respectively. Considering gauge 82, and referring particularly to FIG. 4, it comprises a pair of series-connected resistance grids 82a, 82b mounted on a backing sheet 82c. Grid 82a is interposed between a pair of terminals 82d, 82e, while grid 82b is interposed between terminal 82e and a terminal 82f.

With gauge 82 oriented as shown, the resistance of grid 82a changes with bending occurring in end portion 60 due to movement of portions 56, 58 toward and away from one another. More specifically, with movement of portions 56, 58 toward one another, the resistance decreases and with the portions moved away from each other the resistance increases. Grid 82a is thus referred to herein as an active grid in the gauge. By way of contrast, the resistance presented by grid 82b remains substantially unchanged with bending occurring in end portion 60. As will be more fully explained later, grid 82b is employed to compensate for variations in the resistance of grid 82a produced by temperature changes adjacent gauge 82. Grid 82b is thus referred to herein as a temperature compensating grid in the gauge.

Gauge 84 is oriented relative to end portion 61 in a manner similar to that just described for gauge 82 relative to end portion 60.

Sensor 46 is anchored in a similar manner between angle member 40 and plate 36.

Considering now the mounting of log bunk 18 on frame 17, and referring specifically to FIG. 6, it will be seen that frame 17 comprises a pair of laterally spaced, parallel channels 85 which extend fore and aft in the frame. Opposite ends of log bunk 18 are anchored to channels 85 through a pair of angle members, such as the one indicated at 86 in a broken away portion of FIG. 6, a pair of load sensors 87, 88, which also form a part of the load measuring apparatus contemplated herein, and a pair of mounting channels 89, 90, secured to channels 85.

Sensors 87, 88 each comprise a deformable member similar to member 45 previously described for sensor 44. As is seen in FIG. 7, in which sensor 88 is illustrated, it is anchored in place between angle member 86 and mounting channel 90 in he same manner as has been described for deformable member 45.

Also forming part of sensor 88 in FIG. 7 are a pair of conventional electrical resistance strain gauges 92, 94, similar to gauge 82, previously described. Gauges 92, 94 are secured to the end portions of the deformable member of sensor 88 in the same manner as was described for gauge 82. Similar strain gauges are mounted on the deformable member of sensor 87.

With the load sensors being mounted as described, the entire weight of any load carried on bunks 18, 22 will be transferred to the ground through the deformable members of the sensors. Bolts 72, 74, and nuts 76 may be adjusted to assure that these deformable members perform within the elastic limits of the material forming them.

Turning now to FIG. 5, the grids of gauges 82, 84 in sensor 44, and those of the corresponding gauges in sensor 46, are connected to form a bridge indicated generally at 96. Bridge 96 constitutes a DC voltage transmitter herein. The active and temperature compensating grids of one gauge in sensor 46 are shown at 98a, 98b, respectively, and the corresponding grids of the other gauge in sensor 46 are shown at 100a, 100b, respectively. Also included in bridge 96 is a variable resistor 102. Grids 82a, 84a and resistor 102 in series, and grids 98a, 100a in series, form one set of opposing branches of the bridge. Grids 84b, 98b in series, and grids 82b, 100b form another set of opposing branches of the bridge.

The various branches of bridge 96 re connected between terminals 104, 106, 108, 110 as shown. With the active and temperature compensating grids disposed as shown, a change in temperature adjacent a gauge produces no appreciable effect on the operation of the bridge.

The grids of strain gauges 92, 94 in sensor 88 and those of the corresponding strain gauges in sensor 87 are connected to form another bridge, or DC voltage transmitter, indicated generally at 112, which is similar to bridge 96. The active grids for gauges 92, 94 are shown at 92a, 94a respectively, and the temperature compensating grids are shown at 92b, 94b, respectively. Sensor 87 includes a gauge mounted on one of its ends having active and temperature compensating grids indicated at 116a, 116b, respectively, in the bridge, and another gauge mounted on its other end having active and temperature compensating grids indicated at 118a, 118b, respectively, in the bridge.

Also included in bridge 112 is a variable resistor 120. Grids 92a 94a and variable resistor 120 in series, and grids 116a, 118 a in series, form one set of opposing branches in the bridge. Grids 94b, 116b in series, and 92b, 118b in series, form another set of opposing branches in the bridge. The various branches in bridge 112 are connected between terminals 122, 123, 124, 125 as shown, and these terminals correspond to terminals 104, 106, 108, 110, respectively, in bridge 96.

Referring still to FIG. 5, a pair of conductors 130a, 132 a connect at one set of their ends to terminals 104, 108, respectively in bridge 96. The other set of ends of conductors 130a, 132a connect through a disconnectable coupling 134 (which will be more fully described) to one set of ends of conductors 130b, 132b respectively. Conductors 130b, 132b are connected through conductors 135, 136, respectively, to terminals 122, 124, respectively, in bridge 112. Conductors 130b, 132b connect also to the negative and positive terminals of a source of direct current 137, such as a battery mounted on tractor 12.

Connected to terminals 106, 110, respectively, in bridge 96 are one set of ends of another pair of conductors 138a, 140a. The other set of ends of conductors 138a, 140a connect through coupling 134 to one set of ends of conductors 138b, 140b, respectively. A third pair of conductors, 142, 144 connect to terminals 123, 125, respectively, in bridge 112.

Referring now specifically to coupling 134, it is conventional, having separable component parts 134a, 134b. As is seen in FIG. 1, the coupling is mounted adjacent connector 25, permitting convenient disconnecting of conductors 130a, 132a, 138a, 140a from conductors 130b, 132b, 138b, 140b when it is desired to separate the tractor from the trailer. The conductors and coupling just described collectively form what is referred to herein as conductor means, indicated generally at 146.

Referring to bridge 96, resistor 102 is adjusted whereby with voltage from source 137 supplied terminals 104, 108, and with no load on bunk 22, a certain DC voltage is transmitted to terminals 106, 110, with terminal 110 negative relative to terminal 106. As an illustration, the voltage supplied terminals 104, 108 might be about 10 volts, and the voltage transmitted to terminals 106, 110 under a no load condition on bunk 22 might be about 2 millivolts. The voltage transmitted to terminals 106, 110 varies in relation to the variation in resistance of the active grids of the strain gauges in the bridge caused by the weight of a load deflecting the deformable members in the sensors. An increase in load on bunk 22 will result in an increase in voltage between terminals 106, 110, with the voltage at terminal 110 remaining negative relative to that at terminal 106. Similarly, with voltage from source 137 supplied to terminals 122, 124 of bridge 112 a DC voltage is transmitted to terminals 123, 125 which varies in relation to the weight of a load on bunk 18.

In certain circumstances it may be desirable to regulate the voltage at the points where such is supplied to the bridges. This may be done, for example, by connecting suitable zener diodes between terminals 104, 108 and 122, 124 of bridges 96, 112, respectively, with the cathodes of such diodes connected to terminals 108, 124. This might be done where appreciable changes in the supply voltage may occur, and such changes might affect accuracy of load indications.

Indicator means shown generally at 150 in FIGS. 1 and 5 is mounted in cab 16 of the tractor remote from the load sensors, and is connected to the load sensors by conductor means 146. As will be described more fully below, the indicator means is adapted to indicate a variation in voltage occuring at the output terminals of bridges 96, 112, whereby, the weight of a load carried by the vehicle may be determined.

Referring specifically to FIG. 5, indicator means 150 comprises, in broad terms, an indicator circuit 154 and an input circuit 156.

Input circuit 156 includes a field-effect transistor 160 having the usual gate, drain, and source indicated at 160g, 160d, 160s, respectively. The input circuit includes input terminals 162, 164, with terminal 164 being connected through a pair of conductors 163, 165 to a ground connection 167. Terminal 162 is connected to the wiper 166a of a three position switch 166. Switch 166 also includes terminals 166b, 166c, 166d which are connected to conductors 165, 140b, 144, respectively. Terminal 164 is connected to the wiper 168a, of a three position switch 168. Switch 168 also includes terminals 168b, 168c, 168d. Terminal 168b is a free terminal to which no conductor is connected, while terminals 168c, 168d are connected to conductors 138b, 142, respectively.

Wipers 166a, 168a are ganged for coordinated movement, whereby with wiper 166a contacting terminal 166b, as shown, wiper 168a, contacts terminal 168b. Movement of wiper 166a into contact with terminal 166c results in movement of wiper 168a into contact with terminal 168c; and similarly, movement of wiper 166a into contact with terminal 166d results in wiper 168a contacting terminal 168d.

DC voltage is supplied circuit 156 from a suitable source (which may form part of the tractor's electrical power supply) through a conductor 169 connected to the negative side of the source and a conductor 170 connected to the positive side of the source.

Gate 160g is connected to input terminal 162 through a resistor 172, and to conductor 170 through a capacitor 174 and a resistor 176 which are in parallel. Source 160s is connected to conductor 170 through a resistor 178. The source is also connected to conductor 169 through a resistor 180. Drain 160d is connected to conductor 169 through a resistor 182.

Because of the presence therein of field-effect transistor 160 connected as shown, input circuit 156 operates as a high input impedance amplifier. The importance of this feature will be fully described later. In the preferred embodiment shown, circuit 156 has an input impedance between terminals 162, 164 of about 11 megohms.

Indicator circuit 154 includes a pair of field-effect transistors 190, 192 which are similar to transistor 160. Transistor 190 has a gate, drain, and source, 190g, 190d, 190s, respectively, and transistor 192 has a gate, drain, and source, 192g, 192d, 192s respectively. Gate 190g is connected to conductor 170 through a resistor 196, and also is connected to drain 160d in the input circuit through a resistor 198. Drains 190d, 192d are each connected directly to conductor 169. Gate 192g is connected to the wiper 200a of a potentiometer 200. The potentiometer further includes a winding 200b, one end of which is connected through a resistor 202 to conductor 169, and the other end of which is connected through a resistor 204 to conductor 170.

At 208 is a potentiometer having a wiper 208a and a winding 208b. Wiper 208a is connected to conductor 170. One end of winding 208b is connected through a resistor 210 to source 190a, and the other end of the winding is connected through a resistor 212 to source 192s. An ammeter 216 and a variable resistor 218, connected in parallel with each other, interconnect sources 190s, 192s.

Indicator circuit 154, operates as a differential amplifier. Current supplied ammeter 216 in the circuit varies in a manner directly related to changes in the DC voltage existing across resistor 196; and the DC voltage across resistor 196 varies directly with the DC voltage supplied terminals 162, 164. With wipers 166a, 168a contacting terminals 166b 168b, as shown, terminals 162, 164 are short circuited. In this situation, potentiometers 200, 208 may be adjusted to obtain balanced operation of transistors 190, 192. Further, variable resistor 218 may be adjusted to establish a particular indication by ammeter 216 reflecting the condition with no voltage difference existing between terminals 162, 164.

Explaining briefly the operation of the apparatus, resistors 102, 120 are adjustable whereby, under no-load conditions on bunks 18, 22, substantially the same DC voltages exist between terminals 106, 110 and terminals 123, 125. Wipers 166a, 168a may be switched into contact with terminals 166c, 168c or 166d, 168 d, respectively, to note the readings (which are substantially the same) produced by these voltages in ammeter 216.

A load placed on bunks 18, 22, will cause the end portions of the deformable members to deflect varying the resistances in the active grids of the strain gauges. As a consequence, changes occur in the DC voltages transmitted to the output terminals of the bridges. As has been noted previously, the voltage change which occurs at the output terminals of a bridge is related to the weight supported by the bunk associated with the bridge. With wipers 166a, 168a connected to terminals 166c, 168c, respectively, ammeter 216 produces a reading related to the voltage at the output terminals of bridge 96. Through precalibration, such a reading is readily interpreted to indicate the weight of the load supported on bunk 22. The dial on the ammeter may, for example, be marked in suitable weight increments, whereby a direct weight reading is possible.

A similar procedure is followed in determining the weight of a load resting on log bunk 18, with wipers 166a, 168a in this case being connected to switch terminals 166d, 168d, respectively.

An important feature of the invention is that input circuit 156 in indicating means 150 substantially minimizes the effect which a change in resistance in coupling 134 has on the accuracy of readings produced in ammeter 216. With repeated connectings and disconnectings of parts 134a, 134b in the coupling, it is possible that dirt, or other foreign matter, may collect on the coupling's contacts. If such occurs, the result will be an increase in the resistance in the coupling.

Because of the high input impedance mentioned earlier presented by circuit 156 between terminals 162, 164, a substantial increase in the resistance in coupling 134 can be tolerated without any appreciable effect on the accuracy of readings produced in ammeter 216. For example, with the proposed organization, an increase of several thousand ohms in the resistance in coupling 134 is readily tolerated. Experience has shown that the collection of dirt and other foreign matter typically does not produce this large a change, thus reliability is ensured.

While an embodiment of the invention has been described, it should be obvious to those skilled in the art that variations and modifications are possible without departing from the invention.

It is claimed and desired to secure by letters patent:

1. Load-measuring apparatus for use in a vehicle having at least two disconnectable sections with at least one of such sections including a load support, said apparatus comprising a deformable member which is operatively connected to the load support on the one vehicle section and is constructed to deform in a manner related to the weight of a load on the support, a DC voltage transmitter operatively connected to and responsive to deformation in said member, said transmitter having input terminals adapted to be connected to a source of DC voltage, and output terminals, and being constructed, with a given DC voltage applied to said input terminals, to transmit to said output terminals a DC voltage having a value related to the amount of deformation in said member, electrical indicator means on the other section of said vehicle remote from said output terminals, and conductor means, including a disconnectable coupling operatively interconnecting said output terminals and said indicator means, permitting disconnection of said vehicle sections with the deformable member and transmitter remaining connected to the one vehicle section and the indicator means remaining on the other vehicle section, said indicator means including a input circuit supplied voltage by said conductor means, said input circuit having a sufficiently high input impedance whereby, under substantially all circumstances, with said coupling connected, the value of the voltage supplied said indicator means is substantially the same as the value of the voltage transmitted to said output terminals.

2. The apparatus of claim 1, wherein said voltage transmitter comprises a bridge circuit including an electrical resistance strain gauge mounted on said member.

3. The apparatus of claim 1, wherein said input circuit comprises a field-effect transistor.

4. The apparatus of claim 3, wherein said input circuit includes a pair of input terminals and said transistor has a source element operatively connected to one of said input terminals and a gate element operatively connected to the other input terminal.

5. Load-measuring apparatus for use in a vehicle having a load support comprising a deformable member operatively connected to said support constructed to deform in a manner related to the weight of a load on the support, said member comprising an upper portion connected to the load support, a lower portion spaced below said upper portion and connected to a lower frame in the vehicle and end portions extending between said upper and lower portions to maintain them in their spaced positions, said end portions having arcuate configurations and being subjected to bending about their axes of curvature when a load is placed on the load support, each of said end portions varying in thickness, having its greatest thickness in the region subjected to the greatest bending stress, a DC voltage transmitter operatively connected to and responsive to deformation in said member, said transmitter having input terminals adapted to be connected to a source of DC voltage, and output terminals, and being constructed, with a given DC voltage applied to said input terminals, to transmit to said output terminals a DC voltage having a value related to the amount of deformation in said member, electrical indicator means in the vehicle remote from said output terminals, and conductor means operatively interconnecting said output terminals and said indicator means.

6. The apparatus of claim 5, wherein said voltage transmitter comprises an electrical resistance strain gauge secured to one of said end portions in the deformable member.

7. The apparatus of claim 5, wherein said deformable member further comprises limit means interposed and acting between said upper and lower portions operable to limit the movement of said portions toward each other.

8. The apparatus of claim 7, wherein said limit means is adjustable.